United States Patent Office 3,448,673
Patented June 10, 1969

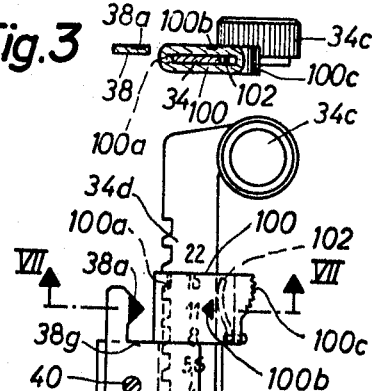
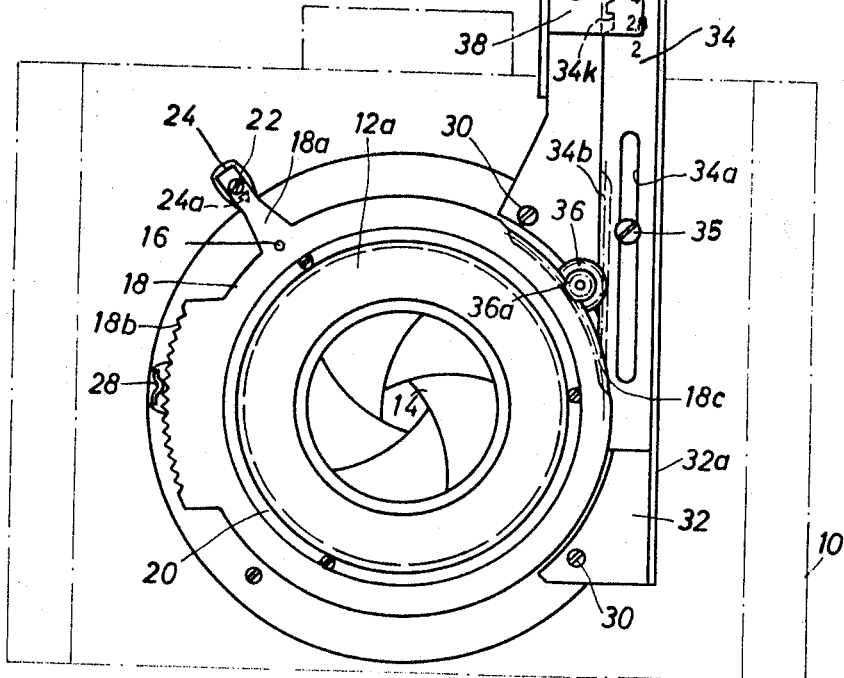
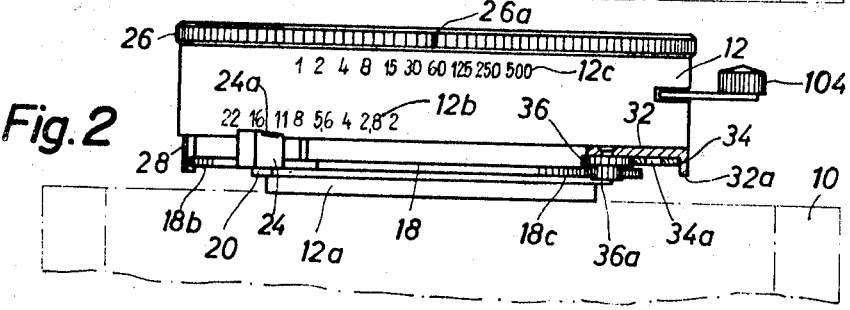

3,448,673
PHOTOGRAPHIC CAMERA
Franz Singer, Munich, Paul K. G. Fahlenberg, Baierbrunn, near Munich, and Peter Lermann, Munich, Germany, assignors to Compur-Werk Gesellschaft mit beschrankter Haftung & Co., Munich, Germany, a firm of Germany
Filed Nov. 9, 1965, Ser. No. 506,974
Claims priority, application Germany, Feb. 23, 1965, C 12,752; Aug. 11, 1965, C 36,622
Int. Cl. G03b 9/06
U.S. Cl. 95—64       4 Claims

ABSTRACT OF THE DISCLOSURE

A photographic camera including a diaphragm setting ring for setting different diaphragm apertures, a diaphragm scale extending peripherally from the photographic housing, a setting slide with an index projecting beyond the periphery of the camera with a driving connection between the diaphragm setting ring and the setting slide so that the different values of diaphragm aperture can be read from the rear side of the camera.

---

This invention relates to a photographic camera with a diaphragm arrangement, the elements of which can be set to different values of diaphragm aperture by means of a diaphragm setting ring, associated with which is a mark and a diaphragm scale extending in the peripheral direction of the diaphragm housing.

It is an object of the present invention to provide an auxiliary diaphragm setting arrangement which can readily be observed and actuated from the rear side of the camera, which is of simple construction and consequently requires only a small number of constructional parts, and which in addition can be associated, where required, with the normal diaphragm setting arrangement in an existing camera.

It is a further object of the invention to enlarge the scope of use of such diaphragm arrangements in such a way that the diaphragm arrangements can be fully opened, successively a number of times during the setting up of the camera, without inspection therein, and re-set to a pre-selected value, for example as is frequently required in the case of studio cameras. This object is met in accordance with the invention by the fact that a coupling detent means is associated with each value of said auxiliary diaphragm scale, a movable abutment member being guided on said setting slide and comprising a coupling nose and an abutment surface, a coupling spring being inserted between said setting slide and said abutment member for the purpose of obtaining an engagement between said coupling nose and one of said coupling detent means, and a counter abutment being arranged on the diaphragm housing and cooperating with said abutment surface on said abutment member.

The arrangement is such that the movable abutment is adjustable, against the action of the coupling spring, transversely in relation to the direction of movement of the setting slide, for the purpose of effecting an uncoupling action.

An embodiment is described in more detail in the following text, which refers to the accompanying drawing.

In this drawing:
FIG. 1 is a diaphragm setting arrangement illustrated as a rear view, the camera itself only being indicated in dotted outline.
FIG. 2 is a plan view of this arrangement, and
FIG. 3 is a detail of the arrangement shown in cross section on the line VII—VII of FIG. 1.

The camera which is shown in the drawing in dotted outline only is, for example, a studio or specialist camera, with provision for inserting a focussing screen at the rear side of the camera to allow for interim inspection of the focussed image. The housing of the camera is designated 10. An objective shutter is fastened to the front wall of this housing by means of securing elements (not shown), and a known mechanism for operating the shutter blades is installed in the housing 12 of this shutter unit. In addition diaphragm blades 14 (for example five in number) are mounted in known fashion in the interior of this shutter housing, and these blades 14 can be set in known manner by means of a diaphragm control member (not shown) which is also mounted in the interior of the shutter unit. This control member is coupled by means of a pin 16 to a diaphragm setting ring 18 which is rotatably mounted externally of the shutter housing and on the rear objective tube 12a, and is held in the axial position by a spring ring 20. The ring 18 has a radial arm 18a on which is fastened, by means of a screw 22, a grip piece 24 made of a plastics material and furnished with a mark 24a which can be set relatively to a diaphragm scale 12b which is arranged at the periphery of the housing 12. In addition a time scale 12c is provided on the housing 12 and this cooperates with a mark 26a of a rotatable time setting ring 26. A fixed catch 28 cooperates with detent notches 18b at the periphery of the ring 18 to hold the latter in the setting position chosen at any time.

The normal diaphragm setting arrangement described above cannot be adjusted and supervised from the rear side. If such setting from the rear side of the camera is, however, desired, the auxiliary diaphragm setting arrangement which is described herein in more detail has additionally to be provided:

A flat guide bar 32 with stand-up guide flanks 32a is secured to the rear wall of the housing 12 by means of screws 30, and a setting slide 34 is guided, through the agency of a pin-slot coupling 35, 34a, on this bar for displacement at right angles to the optical axis of the camera. The slide is equipped with teeth 34b engaged by a toothed pinion 36. This latter is rotatably mounted on the guide bar 32 and is coupled to a further toothed pinion 36a which meshes with teeth 18c of the ring 18. The setting slide 34 is also furnished with a hand piece 34c and a diaphragm auxiliary scale 34d which is adjustable relatively to a fixed mark 38a on a guide clasp 38. This latter is connected to the guide bar 32 by a screw 40.

Thus, using this auxiliary diaphragm setting arrangement in accordance with the invention, the diaphragm setting ring, which is normally adjustable by means of the hand piece 24, is also movable by the setting slide 34 through the pinion 36, 36a. This has the special advantage that, during the interim inspection, the prevailing value of the diaphragm aperture can also be supervised and set from the rear, that is to say from the rear side of the camera, with the assistance of the setting slide 34 and the auxiliary diaphragm scale 34d.

A further advantage of the construction according to the invention is also to be seen in the fact that this auxiliary arrangement can, if need be, also be associated, and without difficulty, with the usual diaphragm setting arrangement of a finished camera, the conversion being possible quickly and with a minimum of additional constructional parts.

In the construction according to FIGS. 1 to 3 an abutment in the form of a sleeve 100 surrounding the slide 34 is provided on this slide to control the movement, this sleeve being made of a transparent plastics material. The abutment 100 has an inwardly projecting coupling tooth 100a which engages in one of the coupling detents 34k at the narrow side of the setting slide 34. A leaf spring 102 fastened in the interior of the movable abutment 100 bears against the setting slide 34 and is therefore biassed to hold the coupling tooth 100a in engagement at all times with one of the coupling detents 34k. The abutment 100 also has an index 100b and a grip surface 100c.

The upper surface 38g of the guide clasp 38 serves as a counter abutment and this projects into the range of adjusting movement of the movable abutment 100 coupled to the setting slide 34.

An arrangement for opening the shutter blades for interim inspection of the image is also installed in the shutter units 12, and this can be operated by an opening lever 104. This arrangement is, for example, of the form forming the subject of pending patent application Ser. No. 278,543, now Patent No. 3,207,053.

The user uncouples the coupling tooth 100a from the detent 38k by a lateral pressure on the grip piece 100c, and then moves the abutment 100 along the slide 34 until the index 100b shows the required diaphragm value on the auxiliary scale 34d. After the grip piece 100c is liberated the parts are engaged in the new setting position at 100a and 34k, under the action of the spring 102. The user now pulls the setting slide 34 upwards to its full extent, as a result of which the diaphragm is fully opened. After the shutter has been opened by means of the opening lever 104, the photographic subject can now be inspected on the focussing screen with the aperture fully open, and the diaphragm adjusted to the pre-selected value by depression of the setting slide, for the purpose of inspecting the depth of field. Since this pre-selection is determined by the movable abutment 100 being brought up against the counter abutment 39g, and can be "felt" during the depression of the slide, the user can implement and can undertaken this setting procedure, and repeat it a number of times, without actual inspection. Moreover he is able to make the pre-selected setting of the movable abutment 100 on the slide 34 during the interim inspection and again without looking at it. Furthermore he is able to bring the setting slide 34 more quickly from the open setting to the pre-selected setting in view of the definite positioning of the pre-selector abutment.

After the dipahragm aperture has been set in this way, the shutter is closed again by means of the opening lever 104, after which the camera is ready for use with the selected diaphragm aperture.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a housing, diaphragm elements in said housing, a diaphragm setting ring for setting said elements to different values of diaphragm aperture, a mark and a diaphragm scale associated with said diaphragm setting ring, said scale extending in the peripheral direction of the housing, a setting slide movable transversally to the optical axis and projecting beyond the periphery of the camera, a driving connection between said diaphragm setting ring and said setting slide, an auxiliary diaphragm scale and an auxiliary index associated with said setting slide for the purpose of reading of different values of diaphragm aperture from the rear side of the camera, a coupling detent means associated with each value of said auxiliary diaphragm scale, a movable abutment member guided on said setting slide and comprising a coupling nose and an abutment surface, a coupling spring inserted between said setting slide and said abutment member for the purpose of obtaining an engagement between said coupling nose and one of said coupling detent means, and a counter abutment arranged on the diaphragm housing and cooperating with said abutment surface on said abutment member.

2. A photographic camera according to claim 1, characterised by the fact that the setting slide is made of a transparent material.

3. A photographic camera according to claim 1, characterised by the fact that the movable abutment member is made of transparent material.

4. A photographic camera according to claim 1, characterised by the fact that the movable abutment is adjustable, against the action of the coupling spring, transversely in relation to the direction of movement of the setting slide, for the purpose of effecting an uncoupling action.

References Cited

UNITED STATES PATENTS

| | | | |
|---|---|---|---|
| 1,018,635 | 2/1912 | Shukis | 95—64 |
| 1,512,514 | 10/1924 | Whiteside | 95—64 XR |
| 2,124,248 | 7/1938 | Frankel | 95—64 XR |
| 2,262,509 | 11/1941 | McNabb | 95—64 |
| 3,046,863 | 7/1962 | Bretthauer | 95—44 XR |

FOREIGN PATENTS 709,208   8/1941   Germany.

OTHER REFERENCES

Specker: German application 1,034,019, printed July 10, 1958.

NORTON ANSHER, *Primary Examiner.*

JOSEPH F. PETERS, JR., *Assistant Examiner.*

US. Cl. X.R.

353—97; 355—71